(12) United States Patent
Sanvido et al.

(10) Patent No.: US 8,315,394 B2
(45) Date of Patent: Nov. 20, 2012

(54) TECHNIQUES FOR ENCRYPTING DATA ON STORAGE DEVICES USING AN INTERMEDIATE KEY

(75) Inventors: Marco Sanvido, Belmont, CA (US); Anand Krishnamurthi Kulkarni, San Jose, CA (US); Cyril Guyot, San Jose, CA (US); Richard M. H. New, San Jose, CA (US); Jorge Campello de Souza, Cupertino, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 944 days.

(21) Appl. No.: 11/923,123

(22) Filed: Oct. 24, 2007

(65) Prior Publication Data

US 2009/0110191 A1 Apr. 30, 2009

(51) Int. Cl.
*G06F 21/00* (2006.01)
(52) U.S. Cl. ............ 380/281; 380/277; 380/44; 726/26
(58) Field of Classification Search .................. 380/281, 380/44
See application file for complete search history.

(56) References Cited

U.S. PATENT DOCUMENTS

| | | | | |
|---|---|---|---|---|
| 5,719,938 A * | 2/1998 | Haas et al. | ....................... | 705/52 |
| 6,272,221 B1 | 8/2001 | Tsunoo | | |
| 6,928,551 B1 | 8/2005 | Lee et al. | | |
| 7,185,363 B1 * | 2/2007 | Narin et al. | ........................ | 726/6 |
| 7,254,838 B2 * | 8/2007 | Kim et al. | ........................ | 726/29 |
| 7,272,231 B2 * | 9/2007 | Jonas et al. | .................... | 380/281 |
| 2004/0025027 A1 | 2/2004 | Balard et al. | | |
| 2005/0157880 A1 | 7/2005 | Kurn et al. | | |

OTHER PUBLICATIONS

Non-volatile memory. (2003). In Webster's New World™ Computer Dictionary.*
Kalinski, B. RFC 2898: PKCS #5: Password-Based Cryptography Specification Version 2.0 (2000).*
"Salt (cryptography)—Wikipedia, the free encyclopedia," Apr. 17, 2007, http://en.wikipedia.org/wiki/Salt_(cryptography).
"Key Wrap—Wikipedia, the free encyclopedia," Dec. 25, 2006, http://en.wikipedia.org/wiki/Key_Wrap.
"Full disk encryption—Wikipedia, the free encyclopedia," Jun. 24, 2007, http://en.wikipedia.org/wiki/Full_disk_encryption.
Larry Swezey et al., "Safeguarding Your Data with Hitachi Bulk Data Encryption," pp. 1-2, 2007.

* cited by examiner

*Primary Examiner* — Kambiz Zand
*Assistant Examiner* — Imhotep Durham
(74) *Attorney, Agent, or Firm* — Steven J. Cahill

(57) ABSTRACT

A data storage device encrypts data stored in non-volatile memory using a bulk encryption key. The data storage device uses a key derivation function to generate an initial encryption key. The data storage device then wraps an intermediate encryption key with the initial encryption key and stores the wrapped intermediate key in the non-volatile memory. The data storage device wraps the bulk encryption key with the intermediate encryption key and stores the wrapped bulk encryption key in the non-volatile memory. The data storage device can unwrap the wrapped intermediate key to generate the intermediate encryption key using the initial encryption key. The data storage device can unwrap the wrapped bulk encryption key to generate the bulk encryption key using the intermediate encryption key. The data storage device decrypts data stored in the non-volatile memory using the bulk encryption key.

19 Claims, 4 Drawing Sheets

US 8,315,394 B2

TECHNIQUES FOR ENCRYPTING DATA ON STORAGE DEVICES USING AN INTERMEDIATE KEY

BACKGROUND OF THE INVENTION

The present invention relates to data storage devices, such as hard disk drives, and more particularly, to techniques for encrypting data stored on data storage devices.

ATA is a standard interface for connecting data storage devices, such as hard disk drives and CD-ROM drives, inside personal computers. The ATA specifications contain a security locking mechanism that protects data stored on a data storage device. The security locking mechanism provides two passwords, a user password and a master password. The passwords are used to provide access control to the data on the storage device.

BRIEF SUMMARY OF THE INVENTION

According to some embodiments of the present invention, a data storage device encrypts data stored in non-volatile memory using a bulk encryption key. The data storage device uses a key derivation function to generate an initial encryption key. The data storage device then wraps an intermediate encryption key with the initial encryption key to generate a wrapped intermediate key and stores the wrapped intermediate key in the non-volatile memory. The data storage device wraps the bulk encryption key with the intermediate encryption key to generate a wrapped bulk encryption key and stores the wrapped bulk encryption key in the non-volatile memory.

According to other embodiments of the present invention, a data storage device uses a key derivation function to generate an initial encryption key. The data storage device then retrieves the wrapped intermediate key from the non-volatile memory and unwraps the wrapped intermediate key to generate the intermediate encryption key using the initial encryption key. The data storage device then retrieves the wrapped bulk encryption key from the non-volatile memory and unwraps the wrapped bulk encryption key to generate the bulk encryption key using the intermediate encryption key. The data storage device decrypts data stored in the non-volatile memory using the bulk encryption key.

Various objects, features, and advantages of the present invention will become apparent upon consideration of the following detailed description and the accompanying drawings.

DETAILED DESCRIPTION OF THE INVENTION

The ATA security features provide some degree of data security. However, ATA passwords can be circumvented, by actively swapping electronics cards, or with a brute force media scan.

Data stored on a hard disk in a hard disk drive (HDD) can be bulk encrypted to prevent these types of attacks. Bulk encryption can be used to enhance the level of data security protection provided by the ATA security locking mechanism. Alternatively, bulk encryption can be linked with some other access control scheme. Bulk encrypting data prevents hard disk drives (HDDs) with user data from being disclosed to unauthorized individuals.

For example, bulk encryption prevents unauthorized users from accessing data on an encrypted hard disk by using a brute force media scan or actively swapping electronics cards to bypass ATA security features. Bulk encryption can also be used to enable a fast secure erase of data on a HDD, or to simplify the redeployment and decommissioning of used systems. In addition, bulk encryption can provide protection against reporting obligations when customer data is lost or stolen.

Figure 1:
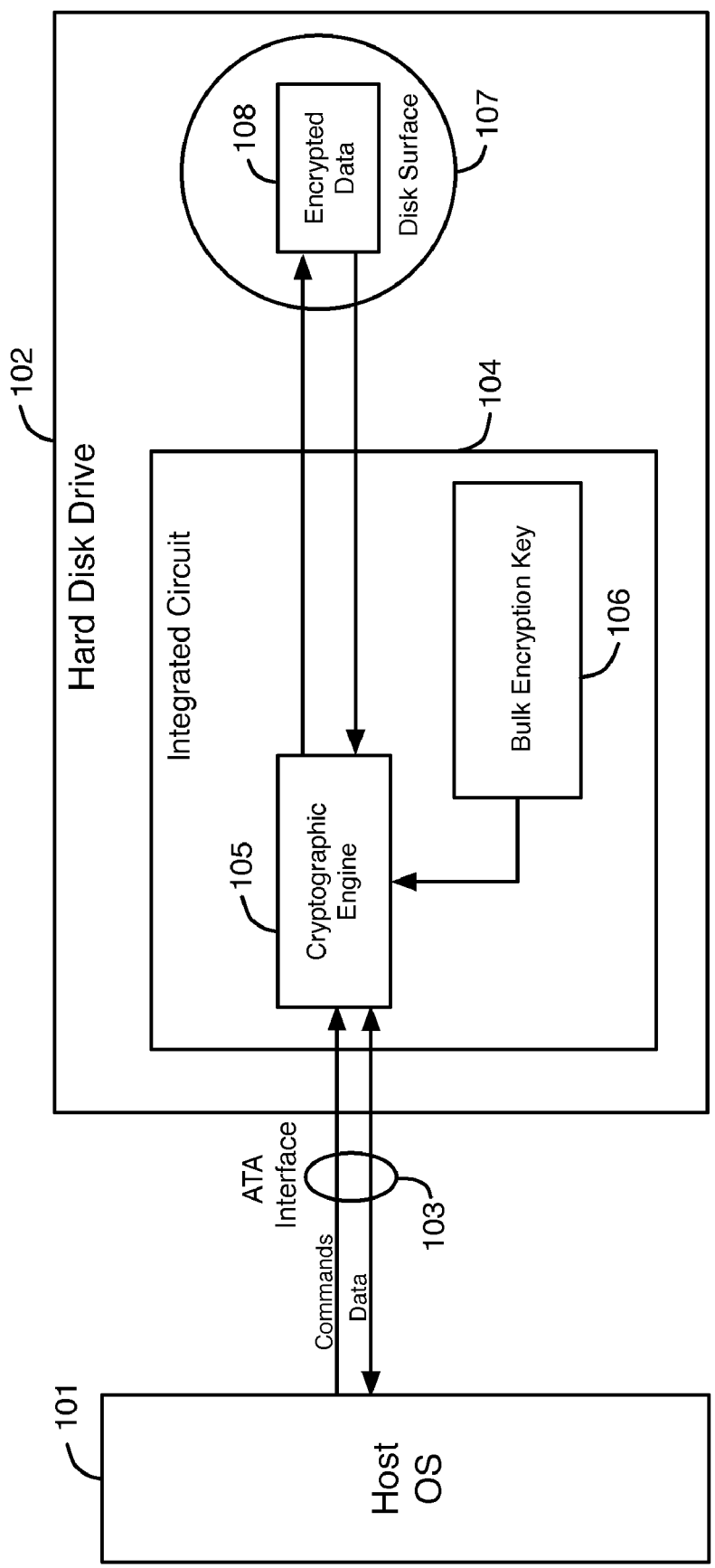
FIG. 1 illustrates an example of a hard disk drive that bulk encrypts data stored on a hard disk, according to an embodiment of the present invention.

FIG. 1 illustrates an example of a hard disk drive 102 that bulk encrypts data stored on a magnetic hard disk, according to an embodiment of the present invention. Host operating system (OS) 101 communicates with hard disk drive 102 through an ATA interface 103. ATA interface 103 controls access to the data stored in hard disk drive 102 using the security locking mechanism described above. Host OS 101 sends a password to hard disk drive 102 through ATA interface 103 to unlock the data stored in drive 102. Once the data is unlocked, host OS 101 sends read/write commands and data to hard disk drive 102 through ATA interface 103, and hard disk drive 102 returns data to host OS 101 through ATA interface 103 in response to the read commands.

Hard disk drive (HDD) 102 contains an integrated circuit (IC) 104 that includes a cryptographic engine 105. Cryptographic engine 105 can be implemented in hardware, in software, or in both hardware and software. Cryptographic engine 105 encrypts data stored on disk surface 107 of a magnetic hard disk using the bulk encryption key 106. As a result, all of the data 108 stored on disk surface 107 is encrypted. Encrypted data 108 can only be accessed with the bulk encryption key 106.

Figure 2:
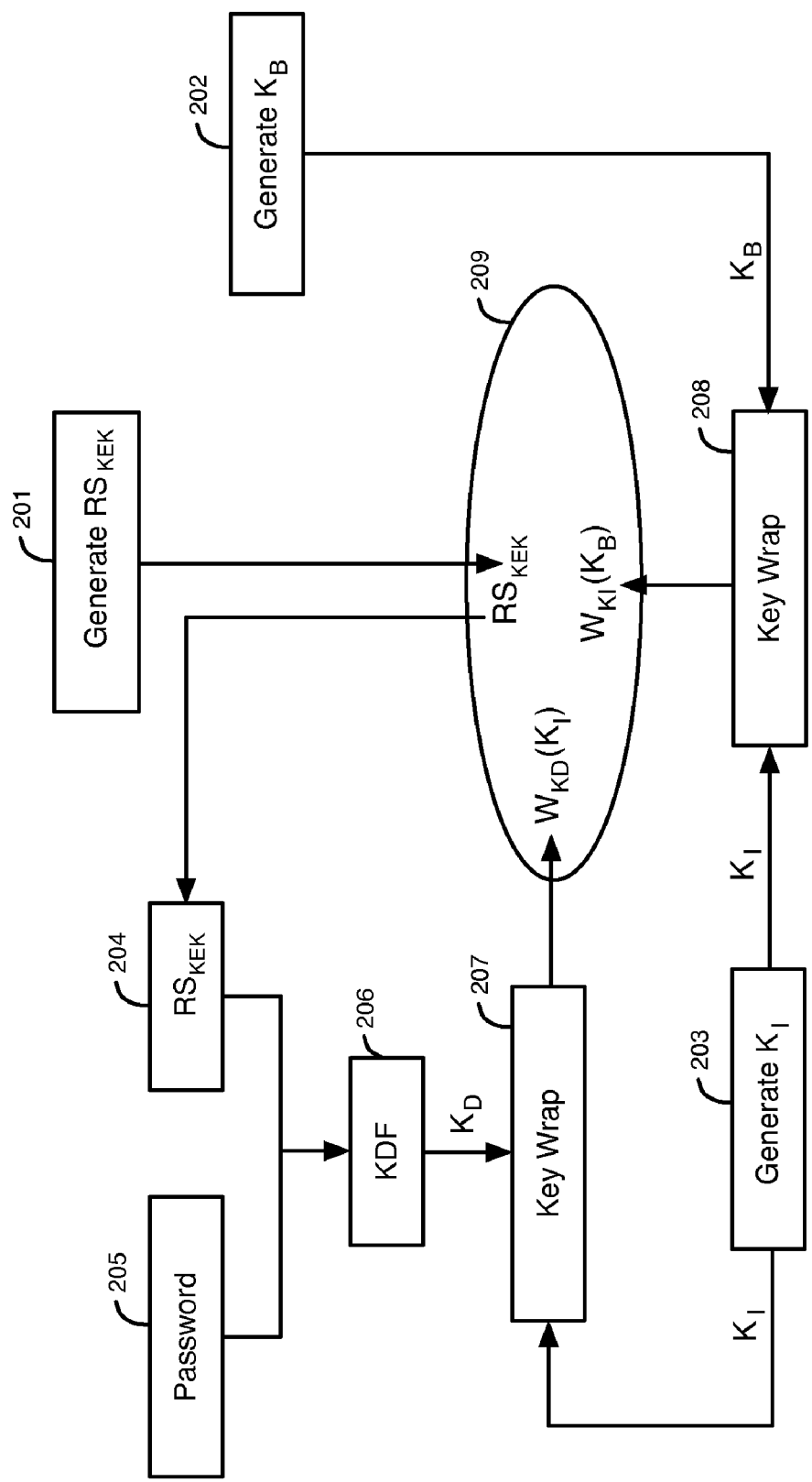
FIG. 2 illustrates an example of a technique for storing a bulk encryption key on a data storage device in a secure manner using an intermediate key, according to an embodiment of the present invention.

FIG. 2 illustrates an example of a technique for storing a bulk encryption key on a data storage device in a secure manner using an intermediate key, according to an embodiment of the present invention. Non-volatile memory 209 illustrated in FIG. 2 is, for example, a magnetic hard disk in a hard disk drive (HDD). Although many embodiments of the present invention are described herein in the context of hard disk drives, it should be understood that techniques of the present invention can be applied to other types of data storage devices, such as optical disk drives, flash memory devices, or other data storage devices having non-volatile memory.

Initially, the hard disk drive (HDD) generates a random salt number $RS_{KEK}$ at step 201. The random salt number can be generated, for example, using a random number generator or a pseudo-random number generator. The random salt number $RS_{KEK}$ is stored on hard disk 209.

The HDD generates a bulk encryption key $K_B$ at step 202 and an intermediate encryption key $K_I$ at step 203. The bulk encryption key $K_B$ and the intermediate key $K_I$ can be generated, for example, using a random number generator or a pseudo-random number generator. The bulk encryption key $K_B$ and the intermediate key $K_I$ are not stored on hard disk 209 so that these encryption keys cannot be stolen by scanning the surface of hard disk 209. The bulk encryption key $K_B$ and the intermediate key $K_I$ are stored temporarily in volatile memory on the HDD. The HDD uses the bulk encryption key $K_B$ to encrypt user data that is stored on hard disk 209.

At step 204, the HDD reads the random salt number $RS_{KEK}$ from hard disk 209. At step 205, the HDD generates a default password or receives a user password from a user of the host operating system. At step 206, the HDD performs a key derivation function (KDF) to generate another encryption key $K_D$ using the password generated or received at step 205 and the random salt number $RS_{KEK}$. Encryption key $K_D$ is specific to the password generated or received at step 205.

At step 207, the HDD wraps the intermediate key $K_I$ using encryption key $K_D$ to generate a wrapped intermediate key $W_{KD}(K_I)$. The key wrapping function performed in step 207 can, for example, be a National Institute of Standards and Technology (NIST) key wrap function that is designed to encrypt a cryptographic key. Integrity measurements are used as a part of the key wrapping function. The integrity measurements are used to check whether the unwrapped key is the correct key. The HDD stores the wrapped intermediate key $W_{KD}(K_I)$ on hard disk 209.

At step 208, the HDD wraps the bulk encryption key $K_B$ using the intermediate encryption key $K_I$ to generate a wrapped bulk encryption key $W_{KI}(K_B)$. The key wrapping function performed in step 208 can, for example, be a NIST key wrap function that is designed to encrypt a cryptographic key. Integrity measurements are used as a part of the key wrapping function. The integrity measurements are used to check whether the unwrapped key is the correct key. The HDD stores the wrapped bulk encryption key $W_{KI}(K_B)$ on hard disk 209.

Each of the password-generated encryption keys (e.g., $K_D$) is generated using a different password, such as one or more user passwords, a master password, an administrative password, etc. Each of the password-generated encryption keys can also be generated using a different random salt number, e.g., $RS1_{KEK}$, $RS2_{KEK}$, etc. For example, steps 204-208 can be repeated using random salt $RS_{MASTER}$ and a master password to generate an encryption key $K_{MASTER}$ that is used to wrap intermediate key $K_I$ to generate $W_{KMASTER}(K_I)$. Each of the wrapped versions of the intermediate key $K_I$ is stored on the hard disk 209. Thus, any of the passwords used to generate a key that was used to wrap $K_I$ can be provided to the HDD to recover $K_I$ and then unwrap $K_B$.

Figure 3:
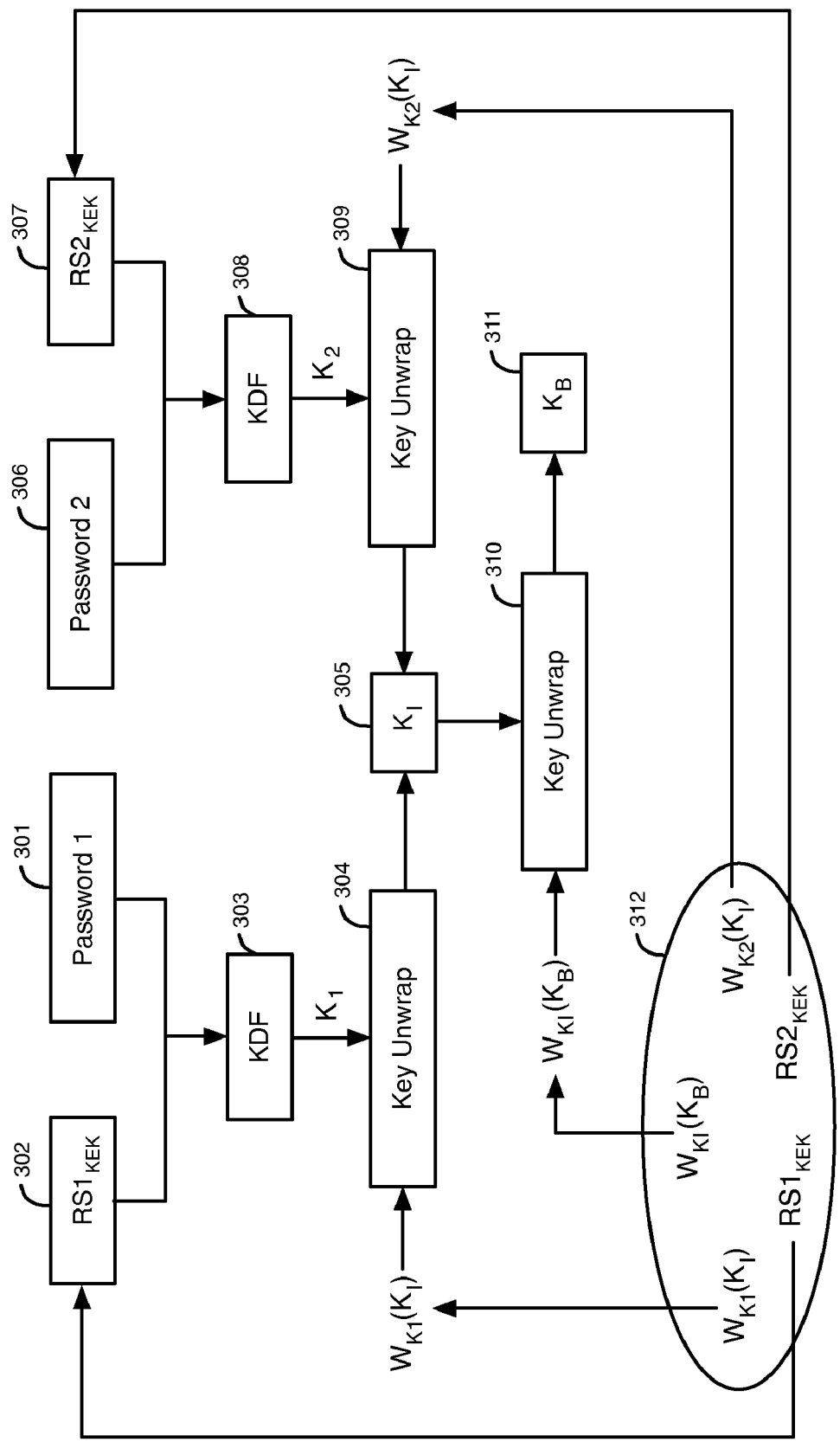
FIG. 3 illustrates an example of a technique for decrypting an encrypted bulk encryption key using an intermediate key, according to an embodiment of the present invention.

FIG. 3 illustrates an example of a technique for decrypting an encrypted bulk encryption key using an intermediate key, according to an embodiment of the present invention. In the embodiment of FIG. 3, user data stored on hard disk 312 in a hard disk drive is encrypted with a bulk encryption key $K_B$. The user data stored on hard disk 312 cannot be decrypted without bulk encryption key $K_B$. The user data stored on hard disk 312 can be decrypted and accessed using the process shown in FIG. 3.

At step 301, the hard disk drive (HDD) receives a first password (password 1) associated with a first user of the host operating system. Password 1 is a password that was previously used in the process of FIG. 2 to generate a key $K_1$ that was then used to wrap intermediate key $K_I$, as described above with respect to FIG. 2. At step 302, the HDD retrieves the first random salt number $RS1_{KEK}$ associated with the first user from hard disk 312. At step 303, the HDD performs the key derivation function (KDF) to regenerate password-generated encryption key $K_1$ using the first random salt number $RS1_{KEK}$ and password 1. The KDF used in step 303 is the same KDF used in the process of FIG. 2 to generate $K_1$.

Then, the HDD retrieves the first wrapped intermediate key $W_{K1}(K_I)$ from hard disk 312. The first wrapped intermediate key is associated with the first user. At step 304, the HDD uses $K_1$ to unwrap $W_{K1}(K_I)$ and to regenerate intermediate key $K_I$. The unwrapping function uses integrity measurements that allow the HDD to determine whether the unwrapped key is the correct intermediate key $K_I$. $K_I$ is stored in volatile memory in the HDD at step 305, not on hard disk 312, to protect the security of $K_I$.

Once $K_I$ has been regenerated, the HDD retrieves the wrapped bulk encryption key $W_{KI}(K_B)$ from hard disk 312. At step 310, the HDD uses $K_I$ to unwrap $W_{KI}(K_B)$ to regenerate the bulk encryption key $K_B$. The unwrapping function uses integrity measurements that allow the HDD to determine whether the unwrapped key is the correct bulk encryption key $K_B$. Once the bulk encryption key $K_B$ has been regenerated, the HDD can use $K_B$ to decrypt the encrypted user data stored on hard disk 312. $K_B$ is temporarily stored in volatile memory in the HDD at step 311. $K_B$ is not stored on hard disk 312 for security purposes. Consequently, there is not enough information stored in the non-volatile memory of the HDD that allows $K_B$ and $K_I$ to be reconstructed to decrypt the data.

The HDD can also recover the bulk encryption from a second password (password 2) that is associated with a second user, without having access to password 1, as shown in FIG. 3. Thus, either user can recover the bulk encryption key using either password 1 or password 2. The HDD receives password 2 from the host operating system at step 306. Password 2 is a password that was previously used in the process of FIG. 2 to generate a key $K_2$ that was then used to wrap intermediate key $K_I$, as described above. At step 307, the HDD retrieves the second random salt number $RS2_{KEK}$ associated with the second user from disk 312.

At step 308, the HDD performs the key derivation function (KDF) to regenerate password-generated encryption key $K_2$ using the second random salt number $RS2_{KEK}$ and password 2. The KDF used in step 308 is the same KDF used in the process of FIG. 2 to generate $K_2$.

Then, the HDD retrieves the second wrapped intermediate key $W_{K2}(K_I)$ from hard disk 312. The second wrapped intermediate key $W_{K2}(K_I)$ is associated with the second user. At step 309, the HDD uses $K_2$ to unwrap $W_{K2}(K_I)$ and to regenerate intermediate key $K_I$. The unwrapping function uses integrity measurements that allow the HDD to determine whether the unwrapped key is the correct intermediate key $K_I$. $K_I$ is stored in volatile memory in the HDD at step 305, not on hard disk 312 to protect the security of $K_I$. Once $K_I$ has been recovered, the HDD can use $K_I$ to unwrap $K_B$ at step 310, as described above.

The HDD can allow a user that has access to the bulk encryption key $K_B$ to change $K_B$ (and re-encrypt the drive with another bulk encryption key) without locking out other users that also have access to $K_B$. For example, user 1 that has access to password 1 can access $K_B$ and then decrypt the user data stored on disk 312. User 1 can then generate a new bulk encryption key $K_{B2}$ and direct the HDD to encrypt the user data using $K_{B2}$. The HDD then wraps the new bulk encryption key $K_{B2}$ with the intermediate key $K_I$ and stores the wrapped bulk encryption key $W_{KI}(K_{B2})$ on hard disk 312.

User 2 has access to password 2. After user 2 enters password 2, the HDD can recover the intermediate key $K_I$, as described above. The HDD can then use the intermediate key $K_I$ to recover the new bulk encryption key $K_{B2}$ at step 310, as described above. Thus, any user who has access to the bulk encryption key can change the bulk encryption key without locking out other authorized users. The other users have access to the new bulk encryption key, because the intermediate key $K_I$ is not changed. Also, user 1 cannot change the wrapped intermediate key $W_{K2}(K_I)$ for user 2.

Figure 4:
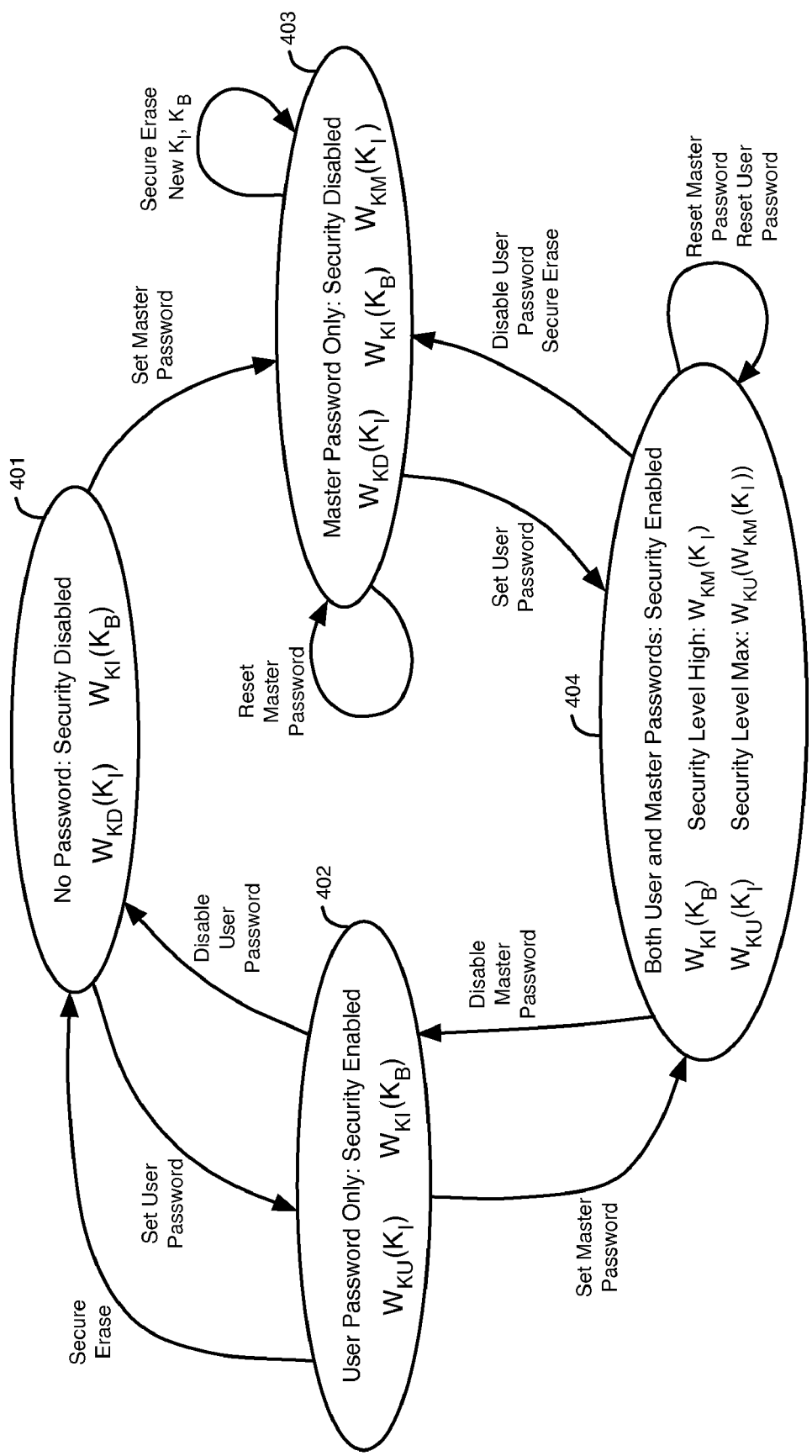
FIG. 4 illustrates an example of a bulk encryption state diagram, according to an embodiment of the present invention.

FIG. 4 illustrates an example of a bulk encryption state diagram, according to an embodiment of the present invention. The bulk encryption state diagram of FIG. 4 includes four data access states 401-404 for a data storage device, such as a HDD.

When the HDD is in state 401, no passwords have been enabled for allowing a user of the host operating system to access the data stored on the hard disk in the HDD. The bulk encryption key $K_B$ is wrapped with an intermediate encryption key $K_I$ and the wrapped result $W_{KI}(K_B)$ is stored on the hard disk. The intermediate key $K_I$ is wrapped with a default password-generated key $K_D$ and the wrapped result $W_{KD}(K_I)$ is stored on the hard disk. The password-generated key $K_D$ is derived using a KDF that receives a random salt number and a default password as inputs. Only the default password can be used to access $K_B$. The user-level security feature is disabled.

The HDD transitions from state 401 to state 402 by setting a user password for a user of the host operating system. In state 402, one or more user passwords are enabled for accessing the encrypted data stored on the hard disk, but no master password has been enabled. The user password is set by prompting the user to enter a password, generating a user password-specific encryption key $K_U$ using the user password and a random salt number, and then wrapping the intermediate key $K_I$ with the user password-specific key $K_U$, as described above. The user password can then be used to regenerate the intermediate key $K_I$. The user-level security feature is enabled in state 402.

The wrapped bulk encryption key $W_{KI}(K_B)$ and the intermediate key $W_{KU}(K_I)$ wrapped with $K_U$ are stored on the hard disk in state 402. The HDD can return to state 401 by disabling the user password or by securely erasing the encrypted data from the hard disk.

The HDD transitions from state 401 to state 403 by setting a master password for an administrator. In state 403, a master password is enabled for accessing the encrypted data stored on the hard disk, but no user passwords have been enabled. The user-level security feature is disabled in state 403. The master password is set by prompting the administrator to enter a password, generating a master password-specific encryption key $K_M$ using the master password and a random salt number, and then wrapping the intermediate key $K_I$ with the master password-specific key $K_M$, as described above.

In state 403, the wrapped bulk encryption key $W_{KI}(K_B)$, the intermediate key $W_{KM}(K_I)$ wrapped with $K_M$, and the intermediate key $W_{KD}(K_I)$ wrapped with the default password-generated key $K_D$ are stored on the hard disk. The administrator can securely erase the encrypted data from the hard disk and regenerate new bulk encryption and intermediate keys $K_B$ and $K_I$. The administrator can also reset the master password and regenerate $K_I$.

The HDD transitions from state 402 to state 404 by setting a master password. The HDD transitions from state 403 to state 404 by setting a user password. In state 404, a user password and a master password are enabled for accessing the encrypted data stored on the hard disk. The user-level security feature is enabled in state 404.

In state 404, the wrapped bulk encryption key $W_{KI}(K_B)$ and the intermediate key $W_{KU}(K_I)$ wrapped with the user password-generated key $K_U$ are stored on the hard disk. The user password and the master password can be reset in state 404 without preventing another user from being able to access the encrypted data stored on the hard disk with another user password. The HDD can return to state 402 by disabling the master password. The HDD can return to state 403 by disabling the user password, securely erasing the disk, and regenerating the bulk encryption key.

ATA defines two different security levels. The two different security levels are High and Maximum (i.e., Max). When the High security level is enabled, the master password has the same capability to access the data encrypted by $K_B$ as the user password. Therefore, $W_{KM}(K_I)$ is stored in the non-volatile memory of the hard disk drive (i.e., on a hard disk).

When the Maximum security level is enabled, the master password does not have access to $K_B$ and cannot decrypt the encrypted data. The wrapped intermediate key $W_{KM}(K_I)$ is not stored in non-volatile memory in the hard disk drive. Instead, $W_{KM}(K_I)$ is wrapped additionally with the user password derived key to generate $W_{KU}(W_{KM}(K_I))$, and $W_{KU}(W_{KM}(K_I))$ is stored in non-volatile memory in the hard disk drive in state 404. This additional wrapping is used because if the user disables the user password, then $W_{KU}(W_{KM}(K_I))$ can be unwrapped to regenerate $W_{KM}(K_I)$, allowing the master password to be used to access bulk encryption key $K_B$ again in state 403.

The foregoing description of the exemplary embodiments of the present invention has been presented for the purposes of illustration and description. It is not intended to be exhaustive or to limit the present invention to the examples disclosed herein. A latitude of modification, various changes, and substitutions are intended in the present invention. In some instances, features of the present invention can be employed without a corresponding use of other features as set forth. Many modifications and variations are possible in light of the above teachings, without departing from the scope of the present invention.

What is claimed is:

1. A method performed on a data storage device for providing security to data stored on the data storage device, the method comprising:
    encrypting data using a bulk encryption key;
    storing the encrypted data in non-volatile memory on the data storage device;
    generating a first password-generated encryption key based on a first password;
    generating a second password-generated encryption key based on a second password;
    wrapping an intermediate encryption key with the first password-generated encryption key to generate a first wrapped intermediate key;
    storing the first wrapped intermediate key in the non-volatile memory;
    wrapping the intermediate encryption key with the second password-generated encryption key to generate a second wrapped intermediate key;
    storing the second wrapped intermediate key in the non-volatile memory;
    wrapping the bulk encryption key with the intermediate encryption key to generate a wrapped bulk encryption key;
    unwrapping the wrapped bulk encryption key to regenerate the bulk encryption key using the intermediate encryption key regenerated from the first wrapped intermediate key;
    decrypting the encrypted data stored in the non-volatile memory using the regenerated bulk encryption key;
    encrypting the data using a new bulk encryption key;
    wrapping the new bulk encryption key with the intermediate encryption key to generate a new wrapped bulk encryption key;
    regenerating the second password-generated encryption key based on the second password;

unwrapping the second wrapped intermediate key to regenerate the intermediate encryption key using the regenerated second password-generated encryption key;

unwrapping the new wrapped bulk encryption key to regenerate the new bulk encryption key using the intermediate encryption key regenerated from the second wrapped intermediate key; and decrypting the data using the regenerated new bulk encryption key.

2. The method defined in claim 1 wherein the data storage device is a hard disk drive and the non-volatile memory is a magnetic hard disk.

3. The method defined in claim 1 further comprising:
storing the wrapped bulk encryption key in the non-volatile memory.

4. The method defined in claim 3 further comprising:
retrieving the wrapped bulk encryption key from the non-volatile memory and unwrapping the wrapped bulk encryption key to regenerate the bulk encryption key using the intermediate encryption key regenerated from the second wrapped intermediate key.

5. The method defined in claim 3 further comprising:
regenerating the first password-generated encryption key based on the first password; and
retrieving the first wrapped intermediate key from the non-volatile memory and unwrapping the first wrapped intermediate key to regenerate the intermediate encryption key using the regenerated first password-generated encryption key.

6. The method defined in claim 5 further comprising:
storing the new wrapped bulk encryption key in the non-volatile memory without preventing a user from accessing the data with the second password.

7. The method defined in claim 1 wherein the first password-generated encryption key, the intermediate encryption key, and the bulk encryption key are not stored on the non-volatile memory in an unencrypted format.

8. A data storage device that comprises code for decrypting data stored on the data storage device, wherein the code is stored on a computer readable medium in the data storage device, the data storage device comprising:
non-volatile memory;
code for generating a first password-generated encryption key based on a first password;
code for wrapping an intermediate encryption key with the first password-generated encryption key to generate a first wrapped intermediate key and storing the first wrapped intermediate key in the non-volatile memory;
code for generating a second password-generated encryption key based on a second password;
code for wrapping the intermediate encryption key with the second password-generated encryption key to generate a second wrapped intermediate key and storing the second wrapped intermediate key in the non-volatile memory;
code for retrieving the first wrapped intermediate key from the non-volatile memory and unwrapping the first wrapped intermediate key to generate the intermediate encryption key using the first password-generated encryption key;
code for retrieving a wrapped bulk encryption key from the non-volatile memory, unwrapping the wrapped bulk encryption key to generate a bulk encryption key using the intermediate encryption key generated from the first wrapped intermediate key, and decrypting data stored in the non-volatile memory using the bulk encryption key;
code for encrypting the data using a new bulk encryption key;
code for wrapping the new bulk encryption key with the intermediate encryption key to generate a new wrapped bulk encryption key;
code for unwrapping the second wrapped intermediate key to regenerate the intermediate encryption key using the second password-generated encryption key;
code for unwrapping the new wrapped bulk encryption key to regenerate the new bulk encryption key using the intermediate encryption key regenerated from the second wrapped intermediate key; and
code for decrypting the data using the new bulk encryption key.

9. The data storage device defined in claim 8 further comprising:
code for wrapping the bulk encryption key with the intermediate encryption key to generate the wrapped bulk encryption key and storing the wrapped bulk encryption key in the non-volatile memory.

10. The data storage device defined in claim 9 wherein code for generating a first password-generated encryption key based on a first password further comprises code for using a key derivation function to generate the first password-generated encryption key based on a first random salt number and the first password.

11. The data storage device defined in claim 9 further comprising:
code for storing the new wrapped bulk encryption key in the non-volatile memory without preventing a user from accessing the data with the second password.

12. The data storage device defined in claim 8 wherein the first password-generated encryption key, the intermediate encryption key, and the bulk encryption key are not stored in the non-volatile memory in an unencrypted format.

13. The data storage device defined in claim 8 wherein the data storage device is a hard disk drive and the non-volatile memory is a magnetic hard disk.

14. A data storage device comprising:
non-volatile memory that stores data; and
an integrated circuit that encrypts the data stored in the non-volatile memory using a bulk encryption key, wherein a first wrapped intermediate key and a second wrapped intermediate key are stored in the non-volatile memory,
wherein the data storage device generates a first password-generated encryption key based on a first password, generates a second password-generated encryption key based on a second password, unwraps the first wrapped intermediate key to generate an intermediate encryption key using the first password-generated encryption key, retrieves a wrapped bulk encryption key from the non-volatile memory, unwraps the wrapped bulk encryption key to generate the bulk encryption key using the intermediate encryption key generated from the first wrapped intermediate key, and decrypts the data stored on the non-volatile memory using the bulk encryption key,
wherein the data storage device encrypts the data using a new bulk encryption key, wraps the new bulk encryption key with the intermediate encryption key to generate a new wrapped bulk encryption key, unwraps the second wrapped intermediate key to regenerate the intermediate encryption key using the second password-generated encryption key, unwraps the new wrapped bulk encryption key to regenerate the new bulk encryption key using the intermediate encryption key regenerated from the second wrapped intermediate key, and decrypts the data using the regenerated new bulk encryption key.

15. The data storage device defined in claim 14 wherein the data storage device uses a key derivation function to generate the first password-generated encryption key based on a first random salt number and the first password, wraps the intermediate encryption key with the first password-generated encryption key to generate the first wrapped intermediate key, wraps the bulk encryption key with the intermediate encryption key to generate the wrapped bulk encryption key, and stores the wrapped bulk encryption key in the non-volatile memory.

16. The data storage device defined in claim 15 wherein the data storage device uses the key derivation function to generate the second password-generated encryption key based on a second random salt number and the second password, wraps the intermediate encryption key with the second password-generated encryption key to generate the second wrapped intermediate key, and stores the second wrapped intermediate key in the non-volatile memory.

17. The data storage device defined in claim 16 wherein the data storage device uses the key derivation function to regenerate the second password-generated encryption key based on the second random salt number and the second password, retrieves the second wrapped intermediate key from the non-volatile memory, unwraps the second wrapped intermediate key to regenerate the intermediate encryption key using the regenerated second password-generated encryption key, retrieves the wrapped bulk encryption key from the non-volatile memory, and unwraps the wrapped bulk encryption key to regenerate the bulk encryption key using the intermediate encryption key regenerated from the second wrapped intermediate key.

18. The data storage device defined in claim 17 wherein the integrated circuit stores the new wrapped bulk encryption key on the non-volatile memory without preventing a user from accessing the data with the second password.

19. The data storage device defined in claim 14 wherein the first password-generated encryption key, the intermediate encryption key, and the bulk encryption key are not stored in the non-volatile memory in an unencrypted format, and the data storage device is a hard disk drive.

* * * * *